United States Patent [19]

Schaefer et al.

[11] Patent Number: 5,661,287
[45] Date of Patent: Aug. 26, 1997

[54] MULTI-PURPOSE LASER/OPTICAL SENSOR IN A STORAGE LIBRARY SUBSYSTEM

[75] Inventors: Robert John Schaefer, Boulder; Stephen Ward Graeber, Louisville; Paul Thomas Currin, Boulder, all of Colo.

[73] Assignee: Breece Hill Technologies, Inc., Boulder, Colo.

[21] Appl. No.: 430,331

[22] Filed: Apr. 28, 1995

[51] Int. Cl.⁶ .................................................. G06K 7/10
[52] U.S. Cl. ........................................ 253/383; 235/462
[58] Field of Search ................................ 235/383, 462; 360/92, 93

[56] References Cited

U.S. PATENT DOCUMENTS

| | | | |
|---|---|---|---|
| 3,943,343 | 3/1976 | Irie | 318/568.15 |
| 4,908,777 | 3/1990 | Wolfe | 364/513 |
| 4,945,429 | 7/1990 | Munro | 360/92 |
| 4,945,430 | 7/1990 | Konishi | 360/92 |
| 5,065,265 | 11/1991 | Pierrat | 360/92 |
| 5,102,280 | 4/1992 | Poduje | 414/225 |
| 5,231,552 | 7/1993 | Schneider | 360/92 |
| 5,237,468 | 8/1993 | Ellis | 360/92 |
| 5,285,333 | 2/1994 | Barr | 360/92 |
| 5,303,034 | 4/1994 | Carmichael | 356/375 |
| 5,321,353 | 6/1994 | Furness | 318/568.11 |
| 5,323,327 | 6/1994 | Carmichael | 364/478 |
| 5,337,297 | 8/1994 | Kuifte | 369/36 |
| 5,479,581 | 12/1995 | Kleinschnitz | 395/82 |

*Primary Examiner*—Donald T. Hajec
*Assistant Examiner*—Karl Frech
*Attorney, Agent, or Firm*—Daniel N. Fishman

[57] ABSTRACT

A method and associated apparatus within a storage library subsystem for utilizing a single light source in combination with a single reflectivity sensor for multiple functions within the storage library subsystem. A laser light source and reflectivity sensor are mounted adjacent one another on the moveable robotic gripper hand internal to the storage library subsystem. The multiple sensing methods and apparatus of the present invention include use of the apparatus for calibrating the robotic positioning mechanisms to permit more tolerance for manufacturing variability, use of the apparatus to sense presence or absence of a magazine or cartridge within the library, and use of the apparatus for reading and decoding barcoded labels on the face of cartridges within the library. Use of a single, simple apparatus for these multiple purposes and functions permit reduction in the complexity of the library subsystem and therefore a reduction in the associated costs.

4 Claims, 7 Drawing Sheets

MULTI-PURPOSE LASER/OPTICAL SENSOR IN A STORAGE LIBRARY SUBSYSTEM

FIELD OF THE INVENTION

The present invention relates to storage library subsystems as commonly used in the computer data storage arts, and in particular, to a single laser device in combination with a single optical sensor for multiple sensing purposes within a storage library subsystem.

PROBLEM

Storage library subsystems provide large capacity secondary storage to modern computing environments. Such storage library subsystems typically employ robotic control mechanisms to physically manage media cartridges used by host computer system. A plurality of media cartridges are stored within the storage library subsystem. Each media cartridge is in a particular slot in the library subsystem. Each slot is identifiable by its physical position in the library subsystem. Each cartridge is typically uniquely identified by a machine readable label. The subsystem maintains inventory information to associate a particular media cartridge with a particular slot in the subsystem. Responsive to a host computer system request, an appropriate media cartridge is physically retrieved from its associated slot in the library, moved to an appropriate read/write device for processing, and inserted into that device. Conversely, when the use of the media cartridge is complete, the media cartridge is retrieved by the robotic mechanisms from the read/write device, moved adjacent its associated slot according the inventory maintained by the subsystem, and inserted into the storage slot of the library ready for future use in response to another host computer system request.

Prior storage library subsystems were often complex and therefore costly, potentially appropriate for centralized large data processing environments, but inappropriate in the more modern decentralized workgroup environments. Computing environments have tended to become smaller ("downsized") and less centralized. In these decentralized computing environments, reduced complexity and associated reduction in costs are essential elements.

One problem with prior designs which contributed to their relatively higher complexity and resultant higher costs relates to the multiplicity and/or complexity of various sensing mechanisms used to sense several parameters of the operating library subsystem. A first sensing mechanism may be used to calibrate the positioning of the robotic servo control mechanisms relative to the locations of the stored media cartridges (stored in associated slots within the library). In more complex robotic mechanisms, a plurality of sensing devices may be required to calibrate the robotic mechanisms in each of several directions. A second sensing mechanism, independent of the first, may be used to sense the presence or absence of a cartridge in a slot. When the slots are grouped into removable magazines additional sensing mechanisms may be required to sense the presence or absence of a removable magazine. Additionally, a third sensing mechanism is commonly used to read machine readable labels on a media cartridge (barcode labels or other optically or magnetically encoded labels).

From the above discussion, it is evident that there is a need for a simpler, lower cost apparatus to calibrate the robotic mechanism positioning, to sense the presence or absence of a removable magazine or of a single media cartridge, and to read optically encoded labels on media cartridges.

Solution

The present invention solves the above problems and thereby advances the art by providing a simpler apparatus for calibrating robotic mechanism positioning, for sensing presence or absence of a magazine or single media cartridge, and for reading optically encoded labels on media cartridges stored within the library. The present invention comprises a laser light source and associated semiconductor reflectivity semiconductor sensor attached to the moveable robotic gripper hand of the library subsystem. The reflection of the laser light source from various surfaces is sensed by the reflectivity semiconductor sensor. Sensing the reflectivity from target lines within the library subsystem is used to calibrate the absolute position of the robotic gripper hand relative to the target marks. All other components within the storage library subsystem are positioned at fixed offsets from the target lines. Once calibrated, reflectivity sensor can be positioned to measure the reflection off the front face of a desired magazine to detect the presence or absence of a magazine in the library. Similarly, the reflectivity sensor can be positioned to measure the reflection off the front face of a desired media cartridge to detect the presence or absence of a cartridge in a particular slot. Finally, the reflectivity sensor can be positioned to sense the optical (barcode) label on the front face of a media cartridge. The barcode sense signal from the reflectivity sensor can be digitally processed to decode the textual equivalent of the optically (barcode) encoded label.

Specifically, the robotic manipulator of the storage library of the present invention is a gripper hand which is moveable vertically (Y-axis) to align with any one of a plurality of slots for holding media cartridges or any one of a plurality of read/write electronic devices which are vertically aligned in a column. The gripper hand is moved vertically in the Y-axis, along a vertically oriented Y-axis support, by a digitally controlled DC servo motor. When vertically positioned in vertical alignment with the desired slot or electronic read/write device, the gripper hand is extended forward (away from, and perpendicular to the Y-axis support) or retracted backward (toward the Y-axis support) by a second digitally controlled DC servo motor. A plurality of magazines having slots adapted to hold media cartridges are positioned around the outer circumference of a rotatable carousel. The carousel is driven to rotate about an axis parallel to the Y-axis support by a third digitally controlled DC servo motor. Solenoid actuators are used to control gripper jaws of the gripper hand. The jaws are spring biased in a closed position in which the jaws are forced toward one another to grip a cartridge between the jaws. The jaws are forced to an open position (with the jaws spread to an wider separation apart from one another) by actuation of the solenoids. The control apparatus of the library subsystem controls the DC servo motors to move the gripper hand or the rotatable carousel to permit the gripper hand to be aligned with any slot in the library subsystem. By extending and retracting the gripper hand in combination with actuation of the solenoids, the control apparatus of the present invention can controllably grip and release a media cartridge for purposes of moving the cartridge within the library subsystem.

A laser light source and reflectivity sensor are mounted on the gripper hand. The rotatable carousel has a white target patch to calibrate the maximum gain of the reflectivity sensor when measuring the reflection of the laser light source. Near the white patch on the carousel is a void patch on the edge of the carousel (a cutout void area in the edge of the material forming the carousel). The void area provides no reflection of the laser light (for all practical purposes). These two patches provide a high and low level of reflectivity to calibrate the roughly linear response of the reflectivity sensor. Once calibrated at power on reset of the library subsystem, the reflectivity sensor may be used to calibrate the positioning of the robotic mechanisms.

An "L-shaped" white target is positioned at two joining edges of the void patch on the edge of the carousel. The white L-shaped target provides a sharp dividing line between high reflectivity at each leg of the L-shaped target and the void patch to which it adjoins. The position of the L-shaped target on the carousel and the vertical position of other fixed components relative to the L-shaped target are fixed with tight tolerances at time of manufacture. The position of the removable magazines relative to the L-shaped target is known to the limits of human intervention in seating the magazines in their support guides. The position of the laser light source and the reflectivity sensor relative to the gripper hand vertical servo position are known with precision from tight manufacturing tolerances. The position of the robotic gripper hand relative to the target is determined by use of the laser light and reflectivity sensor.

The approximate position of the white patch relative to both the carousel rotational servo position and the gripper hand vertical motion servo motor is known from manufacturing specifications. Once positioned at the white patch and after calibrating the gain of the sensor, the control electronic of the library rotate the carousel while sensing the reflectivity to approximately locate the vertical member of the L-shaped target. The control electronics next moves the gripper hand vertically up or down to locate the horizontal member of the L-shaped target. With each member of the L-shaped target located, the more precise position of each edge of the target may be located by finding the vertical or rotational position at which the reflectivity of the laser light is exactly half of the full gain of the reflectivity sensor. That point is the position at which the sensor is most precisely positioned half on vertical or horizontal the edge of the L-shaped target, and half on the corresponding edge of the void patch.

Once the reflectivity gain and servo positioning parameters are calibrated, the laser source and reflectivity sensor are used to detect the presence or absence of a magazine on the carousel, to sense the presence or absence of a cartridge in a particular slot of a magazine, and to read barcoded labels on the face of a media cartridge. This single, simple, inexpensive sensor mechanism replaces various sensors typically used for these multiple purposes in prior designs. The present invention thereby reduces complexity and associated costs as compared to prior approaches in storage library subsystems. Numerous other advantages and features of the present invention will become apparent from the following description when read in conjunction with the accompanying drawings.

DETAILED DESCRIPTION OF THE INVENTION

OVERVIEW

Figure 1:
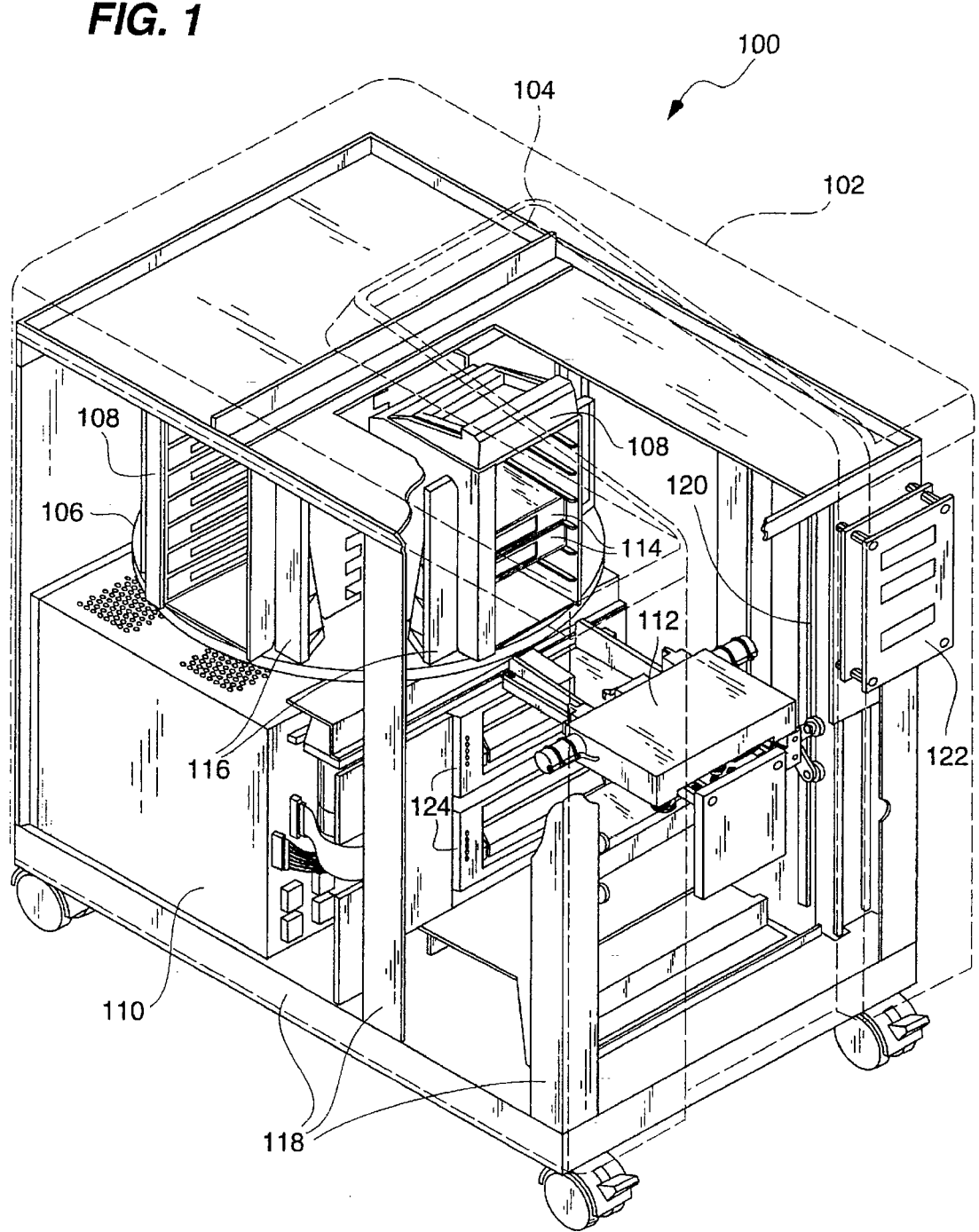
FIG. 1 shows a perspective cut away view of a storage library subsystem which employs the methods and associated apparatus of the present invention.

FIG. 1 depicts a storage library subsystem 100 which embodies the methods and apparatus of the present invention. Storage library subsystem 100 is enclosed by covers 102. Access port 104 permits operator access to the media cartridges in subsystem 100 through covers 102. Within covers 102, structural members 118 form a frame to which components of subsystem 100 are attached. Operator panel 122 provides operator interaction for user manual control of subsystem 100. Rotatable carousel 106 within subsystem 100, holds a plurality of removable magazines 108. Magazines 108 are positioned and supported on carousel 106 by magazine supports 116. Each magazine 108 is adapted to hold a plurality of media cartridges 114. Each cartridge is placed within a slot of the magazine 108. A magazine 108 positioned under access port 104 may be removed by an operator by opening a sliding door (not shown) covering access port 104, and lifting magazine 108 vertically upward and out of library 100. Conversely, an operator may insert a new magazine 108 into library 100 through access port 104. The inserted magazine 108 is mated with, and positioned by, magazine supports 116 on carousel 106. When the sliding door (not shown) covering access port 104 is again closed, library subsystem 100 may manipulate cartridges 114 held in any slot of any magazine 108 on carousel 106. Schneider et al., in U.S. Pat. No. 5,231,552 issued Jul. 27, 1993, discloses a magazine for holding media cartridges useful in storage library subsystem 100. The magazine disclosed by Schneider et al. includes means associated with each slot in the magazine for retaining a media cartridge within the slot. The retention means are actuated to retain or release the associated cartridge by a spring loaded mechanism when the cartridges is pushed deeper into the slot.

Electronic read/write devices 124 are capable of storing and retrieving information on media cartridges 114. Robotic mechanisms within storage library subsystem 100 move media cartridges 114 from slots in a magazine 108 to and from read/write electronic devices 124. Control electronics 110 control and sense the movement of the robotic mechanisms within storage library subsystem 100. Control electronics 110 further provide interface electronics for exchanging command and data with attached host computer systems (not shown). In response to a host computer system request, control electronics 110 actuates the robotic mechanisms to retrieve a requested media cartridge 114 from the magazine 108 in which it is held, move the media cartridge 114 to electronic read/write device 124, and insert the media cartridge 114 into the read/write device 124 for further processing. When the requested processing has completed, control electronics 110 actuates the robotic mechanisms to retrieve the media cartridge 114 from electronic read/write device 124 in which it was previously inserted, and returns the media cartridge 114 to the slot in magazine 108 where it was previously held. Control electronics 110 maintains in an associated memory device an inventory of the location by slot and magazine of each media cartridge 114 within storage library subsystem 100.

Robotic mechanisms of library 100 comprise gripper hand 112 and rotatable carousel 106. Gripper hand 112 is controllably movable by control electronics 110 vertically up and down on Y axis support 120. Rotatable carousel 106 is controllably rotated by control electronics 110 to position one of the plurality of magazines 108 to be aligned with Y-axis support 120. Gripper hand 112 may also be extended forward (toward magazine 108) or retracted backward (away from magazine 108) by control electronics 110. The extension and retraction motion of gripper hand 112 is referred to as "Z-axis" motion. Solenoids 208 (of FIG. 2) are used by control electronics 110 to actuate the grip and release of a media cartridge 114 between gripper jaws 208 of FIG. 2. By combining gripper hand Z-axis motion, vertical motion of the gripper hand on Y-axis support 120, solenoid grip and release, and rotation of carousel 106, control electronics 110 may move any requested cartridge 114 from a slot in a magazine 108 to a read/write device 124 or from a read/write device 124 back to a slot in a magazine 108.

Figure 3:
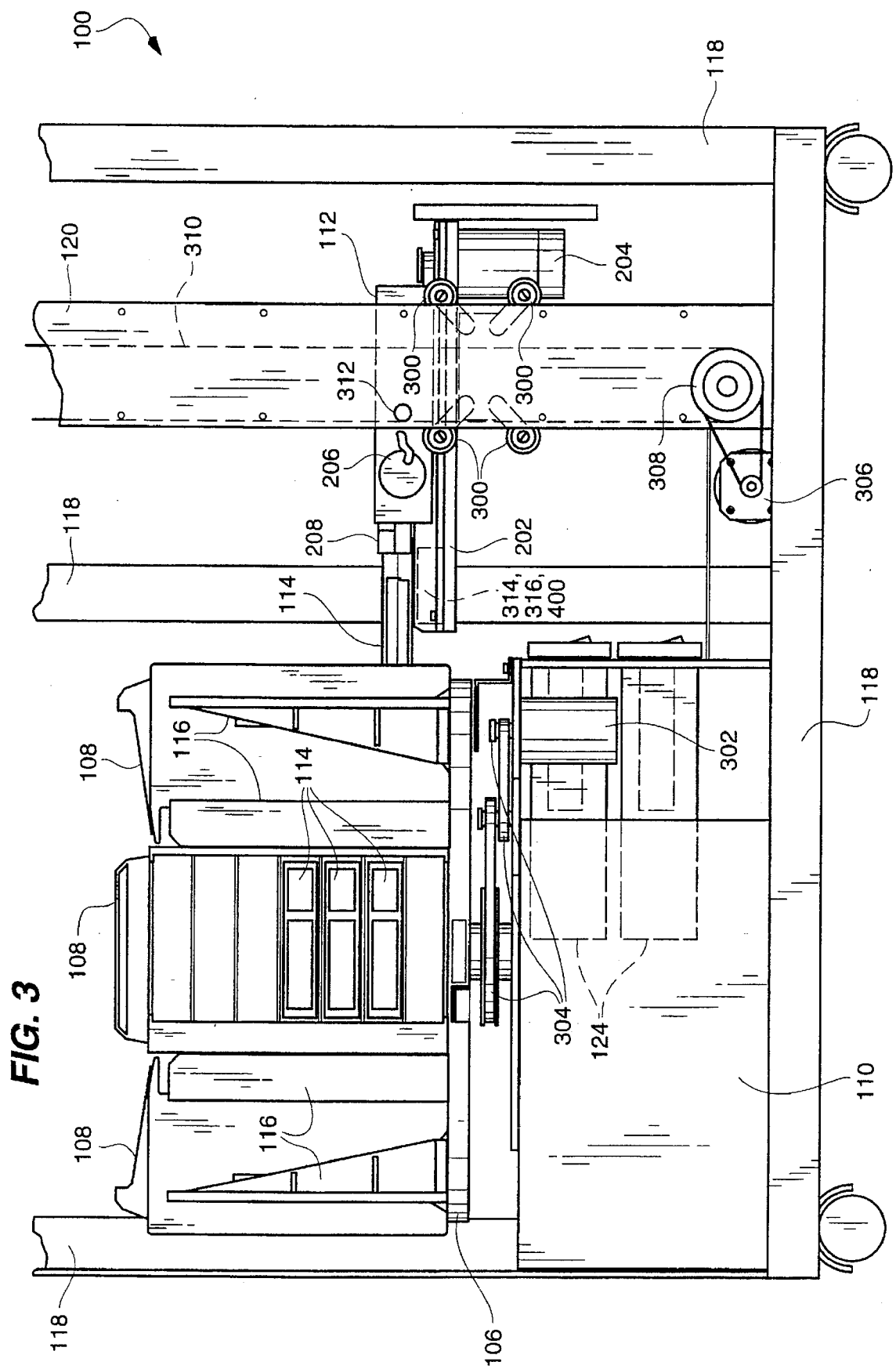
FIG. 3 shows a side cut view of the storage library subsystem show in FIG. 1 with its outer covers removed.

FIG. 3 shows storage library subsystem 100 from a side view with covers 102 removed to reveal additional detail of the robotic mechanisms within. Rotatable carousel 106 is controllably rotated by control electronics 110 by use of digitally controlled DC servo motor 302 and transmission assembly 304. By actuating DC servo motor 302 in a first direction, control electronics 110 controllably rotates carousel 106 in a clockwise direction. By actuation of DC servo motor 302 in the opposite direction, carousel 106 is rotated counterclockwise. Gripper hand 112 is controllably moved vertically up and down on Y-axis support 120 by control electronics 110 use of digitally controlled DC servo motor 306, transmission assembly 308, and driving belt 310. Gripper hand 112 is attached to belt 310 at joint 312. By activating DC servo motor 306 in a first direction, gripper hand 112 can be moved vertically upward on Y-axis support 120. By controllably rotating DC servo motor 306 in an opposite direction, gripper hand 112 can be moved vertically downward on Y-axis support 120. Rollers 300 attached to gripper hand 112 secure the gripper hand to Y-axis support 120 and permit the gripper hand 112 to slide vertically up and down on the support. DC servo motor 204 is controllably activated by control electronics 110, to extend gripper hand 112 forward on its Z-axis (leftward in FIG. 3) toward magazine 108, and controllably activated to retract gripper hand 112 rearward on its Z-axis (rightward in FIG. 3) away from magazine 108. Gripper hand 112 slides on Z-axis rail 202 as it is extended forward and retracted rearward by activation of DC servo motor 204. Gripper jaws 208 are opened by activation of solenoids 206 and closed by deactivation of solenoids 206 to grip or release a media cartridge 114.

As shown in FIG. 3, gripper hand 112 is gripping a cartridge 114 between gripper jaws 208. The media cartridge 114 has been partially retracted rearward to remove the media cartridge 114 from magazine 108. Laser/optical sensor unit 314, is positioned toward the front of gripper hand 112, and is used to calibrate the positioning of gripper hand 112 relative to carousel 106 and slots in magazines 108.

Figure 2:
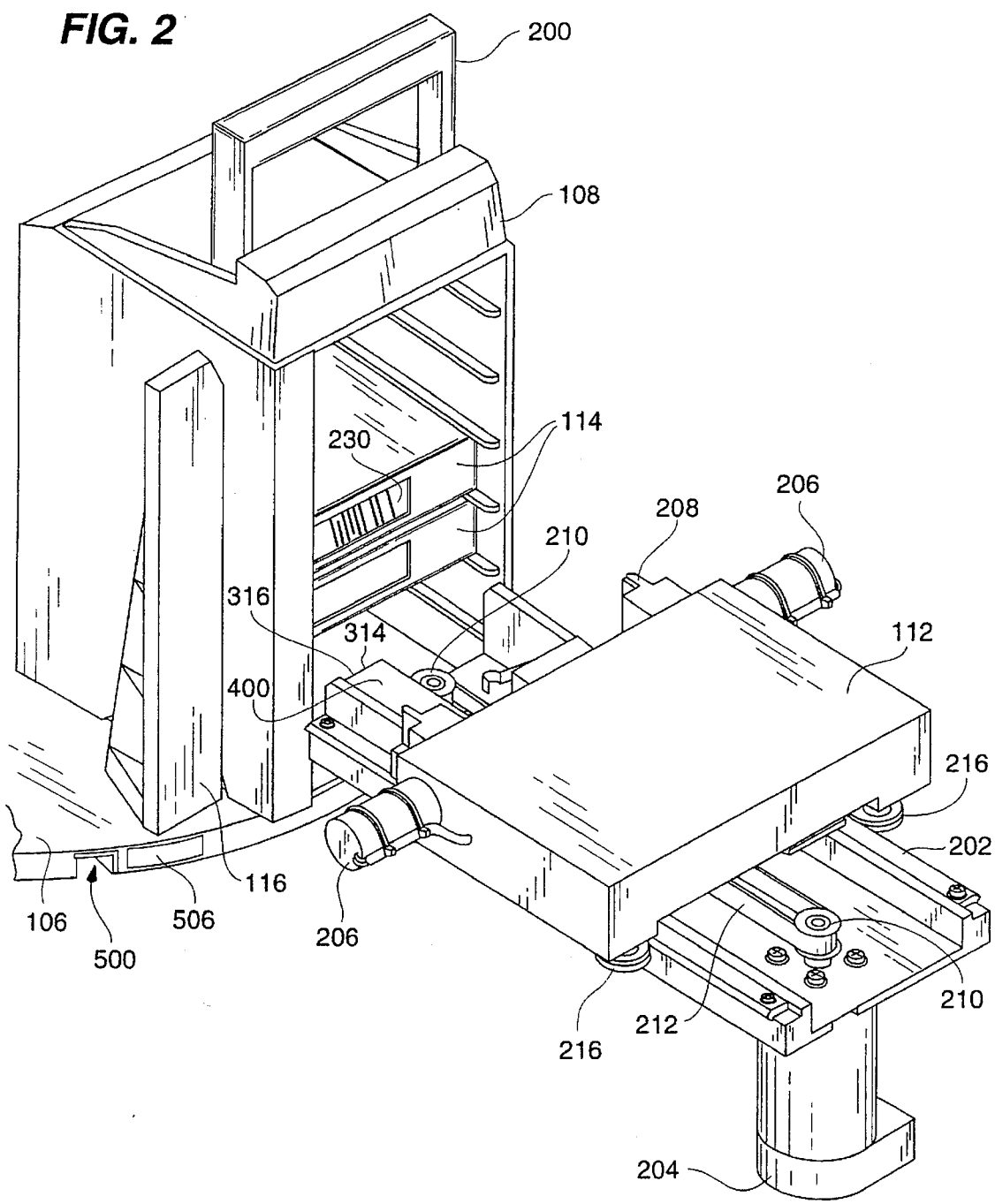
FIG. 2 shows a perspective view of the details of the gripper hand and its relationship to media cartridges in a magazine within the storage library subsystem shown in FIG. 1.

FIG. 2 shows a perspective view with additional detail of gripper hand 112 as it relates to magazine 108 inserted and supported within guides 116 on carousel 106. Gripper hand 112 is adapted to slide forward and backward on Z-axis rail 202. Rollers 216 secure gripper hand 112 to Z-axis rail 202 and permit gripper hand 112 to slide on rail 202. DC servo motor 204 turns pulley 210, which in turn drives belt 212. Gripper hand 112 is affixed to a position on belt 212 (not shown) such that when servo motor 204 is actuated to turn in one direction will move gripper hand 112 forward, and when turned in the opposite direction will move gripper hand 112 rearward. Gripper jaws 208 are spring biased to maintain a closed position, squeezed toward one another when solenoids 206 are inactive. When solenoids 206 are activated by control electronics 110, gripper jaws 208 are driven apart from one another to an open position. In the open position, a media cartridge 114 may be inserted between gripper jaws 208. In the closed position, gripper jaws 208 hold a media cartridge 114 between the jaws.

When retrieving or inserting a media cartridge 114 into a particular slot of a magazine 108, gripper hand 112 is moved vertically up or down on the Y-axis support, such that the top edge of Z-axis rail 202 is aligned just below the bottom edge of the cartridge 114 to be manipulated (either retracted or inserted). When control electronics 110 inserts a cartridge 114 into magazine 108, gripper hand 112 is moved forward by activation of DC servo motor 204. When retracting a media cartridge 114, control electronics 110 moves gripper hand 112 rearward by activation of DC servo motor 204 in the opposite direction. Furthermore, control electronics 110 activates and deactivates solenoids 206 to open or close jaws 208 to thereby release or grip a cartridge 114.

In response to a request received from an attached host computer system, control electronics 110 of library subsystem 100 moves robotic gripper hand 112 vertically up or down on Y-axis support 120 to align gripper hand 112 with an appropriate slot in a magazine 108 containing a requested cartridge 114. In addition, control electronics 110 rotates rotatable carousel 106 to align the desired magazine 108 with the gripper hand 112. The gripper hand 112 is controlled to retrieve a cartridge 114 from a desired slot in magazine 108, or to return a cartridge 114 into a desired slot.

Figure 9:
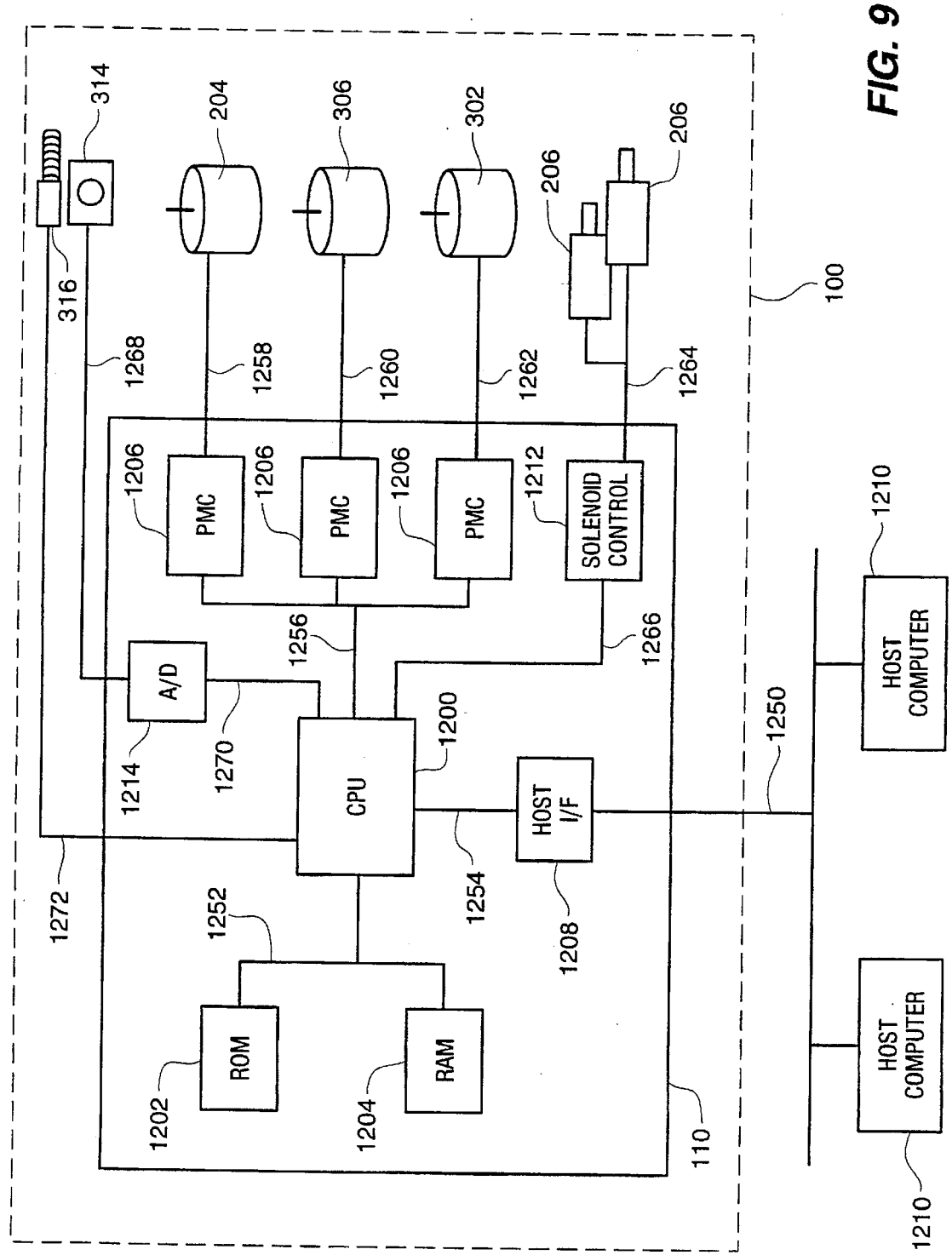
FIG. 9 is a diagram of control apparatus which operates the methods of the present invention.

FIG. 9 shows additional detail of control electronics 110 which performs the methods of the present invention to control the robotic gripper hand 112 and carousel 108 of the storage library 100. Control electronics 110 comprises a CPU 1200 which executes programmed instructions for the methods of the present invention fetched from ROM 1202 over memory bus 1252. CPU 1200 exchanges data with RAM 1204 also over memory bus 1252. Data stored in RAM 1204 includes control variables relating to control of the robotic mechanisms of the library 100 as well as host computer 1210 related communication variables and buffers. CPU 1200 exchanges, information (including commands, status and data) with one or more host computer systems 1210 via bus 1254 and host I/F controller 1208. Host I/F controller 1208 converts information exchanged with CPU 1200 over bus 1254 into signals and protocols applicable to host communications bus 1250. Host communications bus 1250 may be any of several well known peripheral interface standards including local area network (LAN) connections, or, in the preferred embodiment of the present invention, SCSI.

CPU 1200 exchanges command and status information with each of three precision motion controllers 1206 over bus 1256. Precision motion controllers (PMC) 1206 are any of several standard motion controller integrated circuits used for the control of servo motors. In the preferred embodiment of the present invention, a National Semiconductor LM628 or LM629 is used for each of three PMCs 1206. One of ordinary skill in the art will recognize many equivalent controller circuits which are capable of controlling servo motors on behalf of CPU 1200 and providing status information back to the CPU 1200. A first PMC 1206 controls DC servo motor 204 over bus 1258 to extend and retract the gripper hand 112. A second PMC 1206 controls Y-axis DC servo motor 306 over bus 1260 to move the gripper hand 112 up and down on Y-axis support 120. The third PMC 1206 rotates carousel 106 by applying signals over bus 1262 to servo motor 302. CPU 1200 applies signals over bus 1266 to solenoid controller 1212 which, in turn, activates and deactivates solenoids 206 to open and close gripper jaws 208. Reflectivity sensor 314 applies its analog output signal to A/D converter 1214 over path 1268. CPU 1200 samples the output of reflectivity sensor 314 converted to digital values via bus 1270 through A/D converter 1214. Laser light source 316 is controlled by CPU 1200 via path 1272.

CPU 1200 combines motions of the robotic mechanisms, exchanging information with PMCs 1206 to control DC servo motors 204, 302, and 306, and activation and deactivation of solenoids 206 through solenoid controller 1212, to grip, release, and move media cartridges 114 within library 100.

Figure 4:
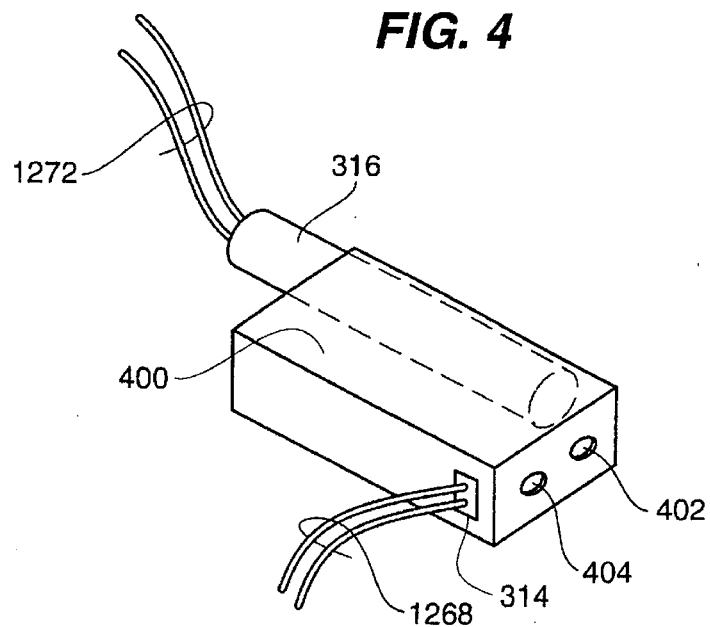
FIG. 4 shows additional detail of the mounting of laser light source and reflectivity sensor on the robotic gripper hand of FIG. 2.

FIG. 4 depicts additional detail of the laser light source 316 mounted in mounting block 400 adjacent reflectivity sensor 314 (also mounted in mounting block 400). Conductor path 1272 from control electronic 110 turns the laser light source 316 on and off. Reflectivity sensor 314 applies it analog output signal to conductive path 1268. Laser light source 316 may be any of several standard light sources and is preferably a Toshiba TOLD-9211 or Hitachi HL-6712-G1 generating a collimated beam at a wavelength of approximately 670 nm. with a power of approximately 5 mW. Reflectivity sensor 314 may be any of several standard optoelectronic sensing devices and is preferably an Optek QP560A, OP560B, or QP560C NPN Silicon Photodarlington. Reflectivity sensor 314 is unfocused and achieves a high depth of field (up to approximately 5 inches) with a 10 degree view angle. The laser light source 316 produces a spot size of approximately 0.008". Laser light source 316 emits its light through hole 402 in mounting block 400. Reflectivity sensor 314 receives unfocused reflections of light through hole 404 of mounting block 400. As shown in FIG. 2, mounting block 400 with mounted holes 402 and 404 positioned at the forward edge of the Z-axis rail 202 of gripper hand 112.

Figure 5:
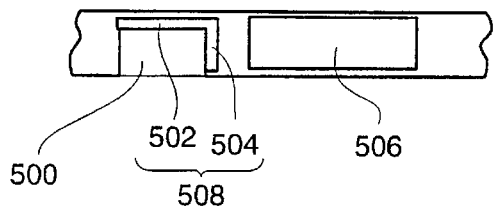
FIG. 5 shows additional detal of the L-shaped target and calibration patches on the carousel of FIG. 2.

FIG. 2 shows a highly reflective white patch 506 on the edge of rotatable carousel 106. Adjacent the white patch 506 is a void patch 500 where the material forming the carousel 106 is removed to provide (essentially) no reflectivity. FIG. 5 shows the white patch 506 and the void patch 500 in a straight edge on view. White patch 605 and void patch 500 are used as described below in calibrating the gain of the reflectivity sensor and associated A/D converter 1214 of FIG. 2. In FIG. 5, it can be seem that the void patch 500 is bordered on two of its three edges with white stripes, namely a horizontal stripe 502 abutting a vertical stripe 504. The abutting white stripes together are also referred to herein as L-shaped target 508. The reflectivity sensor 314 is used to locate the L-shaped target 508 in initial position calibration of the moveable, servo controlled, robotic mechanisms.

SENSOR GAIN CALIBRATION

Figure 6:
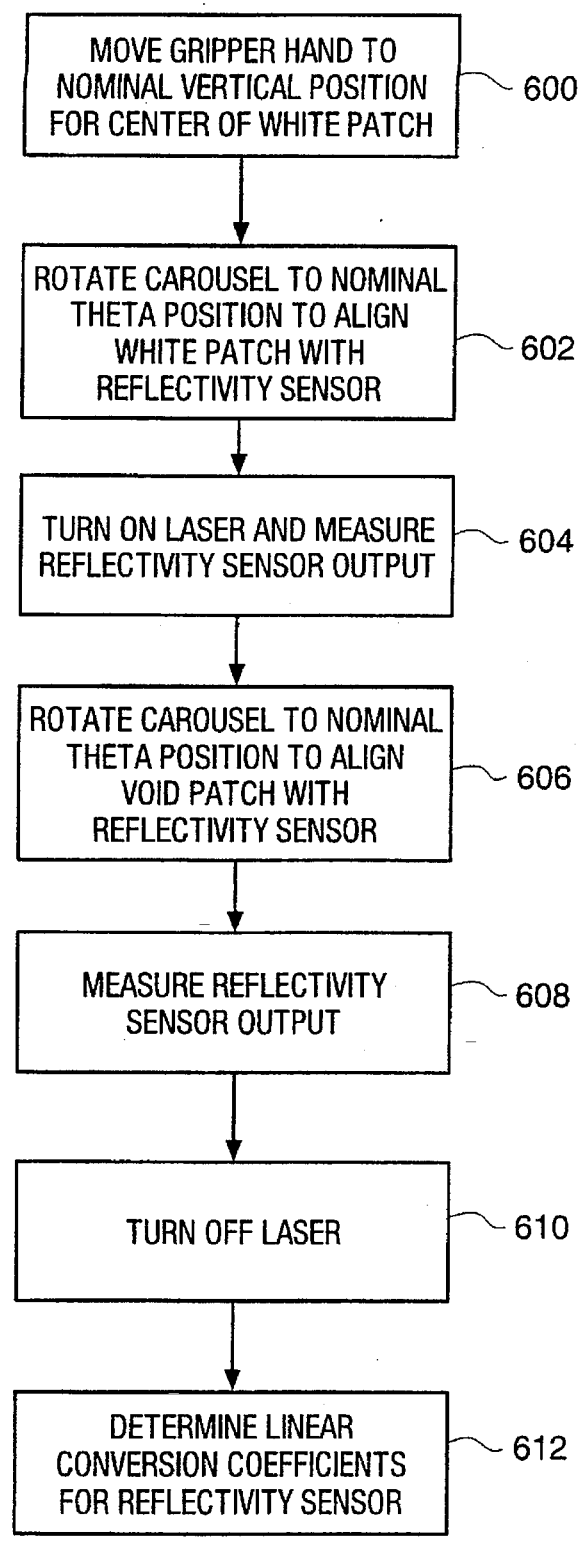
FIG. 6 is a flowchart of the process of calibrating the gain on the reflectivity sensor of FIG. 4.

FIG. 6 is a flowchart of the steps used when calibrating the gain of reflectivity sensor 314 and the associated A/D converter 1214 of FIG. 2. Element 600 is operable to move the laser light source 316 and the reflectivity sensor on gripper hand 112 vertically on Y-axis support 120 by activation of DC servo motor 304 to the nominal vertical position of the center of the white patch 506. Element 602 is then operable to rotate the carousel 106 to the nominal rotational axis position to align the center of white patch 506 with the reflectivity sensor 314 and laser light source 316. Manufacturing tolerances and the size of white patch 506 are sufficient to assure that positioning the carousel 106 and the gripper hand 112 at nominal positions to align at the center point of the patch will assure that the light from laser light source 316 will strike the patch and will further assure that the entire angle of view of reflectivity sensor 314 will be covered by the white patch 506.

Element 604 is next operable to turn on laser light source 316 by applying a signal to path 1272. Element 604 is further operable to measure the reflectivity as signified by the signal output from reflectivity sensor 314 on conductive path 1268. The output signal on path 1268 is applied as input to A/D converter 1214 and converted to a digital value applied to bus 1270 for use by CPU 1200. The digital value represents the highest level of output of the sensor 314 for application in the storage library subsystem 100.

Element 606 rotates carousel 106 by activation of DC servo motor 304 to align void patch 500 on the edge of the carousel 106 with the position of laser light source 316 and reflectivity sensor 314 on gripper hand 112. As in element 602 above, the size of void patch 500 and manufacturing tolerances are sufficient to assure that the light from laser light source 316 and the entire angle of view of reflectivity sensor 314 fall completely within the bounds of void patch 500.

Element 608 next measures the reflectivity output signal from sensor 314. This signal output represents the lowest level of output of sensor 314 for application in the storage library subsystem 100. Element 610 then turns off laser light source 316. This low value measured by element 608 and the high value measure by element 604 are used by element 612 to compute coefficients of the linear response curve of reflectivity sensor 314. These coefficients are then applied to all further measurements of reflectivity to normalize all reflectivity measurements made by reflectivity sensor 314.

THETA AND VERTICAL POSITION CALIBRATION

Figure 7:
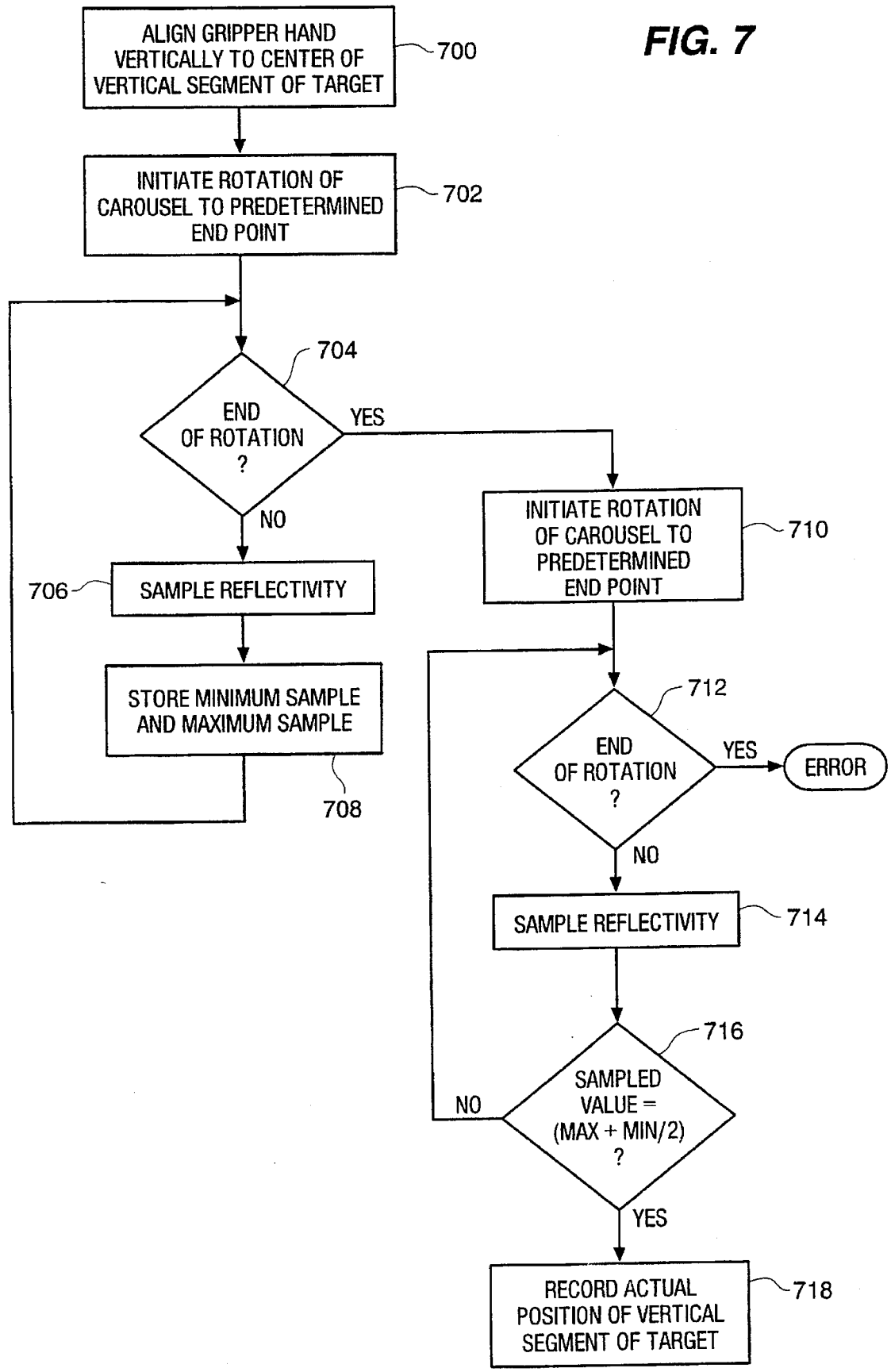
FIG. 7 is a flowchart of the process of calibrating the robotic positions using the sensor of FIG. 4.

FIG. 7 is a flowchart describing the operation of the present invention applied to the calibration of the theta position (rotational axis) of the carousel 106 as it relates to DC servo motor 302 positions. A nearly identical process to that of FIG. 7 may be applied to calibrate the vertical position of the gripper hand 112 as it relates to the DC servo motor 204 positions. Element 700 is operable, in a manner similar to element 600 described above, to align gripper hand 112 vertically with the nominal position of the center of the vertical stripe 504 at the edge of void patch 500. Element 702 then initiates rotation of carousel 106 such that the vertical stripe will pass through the beam of laser light source 316 and the view of sensor 314. The rotation is for a predetermined distance to assure that the vertical stripe 504 passes through the view of sensor 314. As the carousel is rotating elements 704 through 708 are repeated in a loop. Element 704 tests whether the initiated rotation has completed its predetermined distance. If so, the loop completes and processing continues with element 710. Otherwise, element 706 samples the converted digital value indicating the current reflectivity signal output from sensor 314. The A/D converter 1214 output value is normalized as discussed above. Element 708 is then operable to compare the sampled value to previous sampled values in the operation of elements 704 through 708 to determine the minimum value sampled and the maximum value sampled. If the presently sample values is smaller than all previously sampled values then the presently sampled value is stored in a temporary memory variable as the new minimum sampled value. Likewise, if the presently sample values is larger than all previously sampled values then the presently sampled value is stored in a temporary memory variable as the new maximum sampled value. Processing then continues by looping back to element 704.

Following the operation of the above loop, element 710 again initiates rotation of carousel 106 to cause vertical stripe to pass through the beam of light source 316 and the view of sensor 314. Elements 712 through 716 are then operable as a loop. The maximum value sensed in the above loop is indicative of the stripe passing through the field of view of sensor 314. The minimum value is indicative of the void patch passing through the view of sensor 314. When the average value of the stored minimum and maximum is detected as the output of sensor 314, then the field of view of sensor 314 is half filled by the stripe 504 and half filled by the void patch 500. In other words, the edge of stripe 504 is then detected and the position of the servo motor 302 is read to record this calibration point for future rotational motion of the carousel 106. Specifically, element 712 tests if the rotation has completed it predetermined distance of rotation. If so, then the average value of the sensor was not encountered and an error condition arises. Several standard error reporting or recovery methods may be employed by the choice of one skilled in the art. If element 712 determines that rotation is continuing, then element 714 is operable to sample the current value of the sensor (through A/D converter 1214 over path 1270 and normalized). Element 716 then tests whether the sampled value is equal to the average of the stored minimum and maximum. If the average value is not yet encountered, then the loop continues with element 712. Otherwise, if the average value is encountered, then the loop processing completes and processing continues with element 718. One of ordinary skill will recognize that the test need not (must not) be for precise equality. The sensor 314 output and A/D converter 1214 could introduce enough error to fail the equality test. One of ordinary skill will readily recognize several approaches to this comparison. For example, a range of values on either side of true equality could be applied to the test, or the test could monitor the slope of the values sampled to determine when the value sampled value has crossed the average value on its rise (or fall) from a lower (or higher) value.

Element 718 is next operable to record the position of servo motor 302 at the time element 716 determined that the average value has been encountered. This location is then used in all future rotation motion of carousel 106 as a calibration value to offset all nominal positions of magazines and slots coded into the control electronics 110 at time of manufacture of the storage library subsystem 100. One of ordinary skill in the art will recognize that additional heuristic tests may be applied to this process. For example, if the resultant rotational calibration position is outside a reasonable manufacturing tolerance, the process may be retried, or an error condition may be reported by the library subsystem 100.

One of ordinary skill in the art will recognize that a process nearly identical to that of FIG. 7 may be employed to calibrate the vertical position of gripper hand 112 as it relates to DC servo motor 306 positions. Such a procedure would align the carousel 106 rather than the gripper hand 112 at element 700. Elements 702 and 710 would initiate vertical motion of the gripper hand 112 rather than rotation of carousel 106. Likewise, elements 704 and 712 would test for completion of the vertical motion rather than rotational motion. Horizontal stripe 502 rather than vertical stripe 504 would pass through the field of view of sensor 314. Lastly, the resultant vertical Y-axis) calibration position is stored and applied to subsequent vertical motion of the gripper hand 112 rather than carousel 106 rotation.

MAGAZINE/CARTRIDGE PRESENCE SENSING

Laser light source 316 and reflectivity sensor 314 of the present invention on gripper hand 112 are used in the storage library subsystem 100 to sense the presence or absence of a magazine 108 in an expected location on carousel 108 and to sense presence or absence of a media cartridge 114 in a slot of a magazine 108. The present invention uses the light source 316 and sensor 314 aimed at a face of a magazine 108 or media cartridge 114 which faces gripper hand 112. The reflection of the laser light source 316 off the face of magazine 108 or cartridge 114 indicates the presence of the cartridge 114 or magazine 108 if the sensor 314 indicates a reflection value above a predetermined minimum threshold value. Although the face of the magazine 108 or cartridge 114 may be darkened in color, the beam from the laser light source 316 is reflected sufficiently to sense the object presence as compared to no reflection when the magazine 108 or cartridge 114 is not present.

Figure 8:
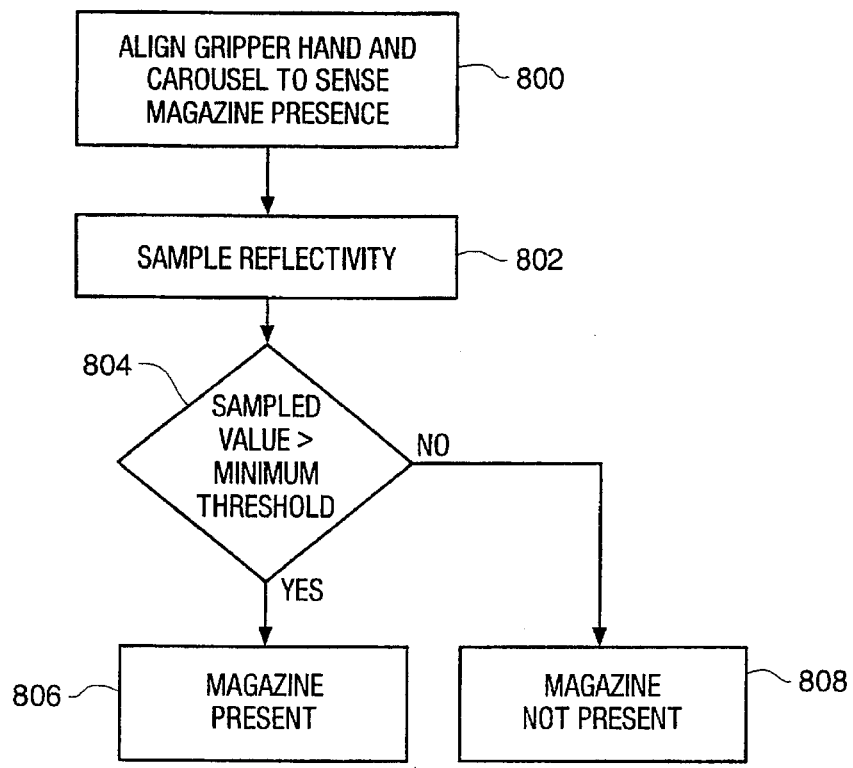
FIG. 8 is a flowchart of the process of sensing the presence or absence of a magazine or carriage in the library of FIG. 1.

FIG. 8 is a flowchart of the processing involved to sense the presence of a magazine 108 on carousel 108. Element 800 is operable to rotate carousel 108 by activation of DC servo motor 302 and to move gripper hand. 112 vertically on Y-axis support 120 by activation of DC servo motor 204. The carousel 108 and gripper hand 112 are moved to a position which aligns the laser light source 316 and the sensor 314 on gripper hand 112 with a point on the face of a magazine 108. Element 802 then turns on laser light source 316, reads, and normalizes the digital value converted by A/D converter 1214 from sensor 314. The reflectivity value so sampled in element 802 is then compared to a predetermined minimum threshold value by operation of element 804. If the sampled value is greater than the threshold value, then the process completes with element 806 indicating that the magazine 108 is present. Otherwise, the process completes with element 808 indicating the magazine 108 is absent from the carousel 106.

One of ordinary skill in the art will readily recognize a nearly identical process to that depicted in FIG. 8 and described above for detecting the presence or absence of a media cartridge 114. In such an alternative process, the carousel 106 and gripper hand 112 are moved in element 800 to align the light source 316 and sensor 314 with the face of a media cartridge 114 rather than a magazine 108. Similarly, elements 806 and 808 would indicate the presence or absence of a media cartridge 114 rather than a magazine 108.

BARCODE SENSING

Laser light source 316 and sensor 314 of the present invention in gripper hand 112 are useful in reading barcoded labels on the face of a media cartridge 114. One cartridge 114 of FIG. 2 shows an exemplary barcode 230 on its label. Methods for reading of barcoded labels are well known to those of ordinary skill in that art. The present invention advances the art of storage library subsystems in that it utilizes the laser/optical sensing device (light source 316 coupled with reflectivity sensor 314) also used for other sensing and calibration purposes. The multiple usage of the sensor 314 for barcode reading as well as for calibration and to replace other sensors simplifies the overall structure of the library subsystem 100 to thereby reduce its costs.

The present invention may read a bar code by aligning the carousel 108 and sensor 314 on gripper hand 112 so that the sensor is positioned at the start of the nominal position for a barcode 230 label on the face of a media cartridge 114. Rotating carousel 108 while continuously reading and storing the sampled values of sensor 314 permits control electronics (CPU 1200) to scan the reflectivity across the entire barcode 230 label area of the face of the cartridge 114. Having the barcode label thus digitized and stored, CPU 1200 of control electronics 110 may process the digitized sampled data using well known digital signal processing techniques to interpret the barcode label 230.

There has been described a novel method and associated apparatus which provides for utilizing a single laser light source in combination with a single reflectivity sensor for multiple sensing and calibration functions within a storage library subsystem. It is evident, now that the invention has been fully disclosed, that those skilled in the art may now make numerous uses and modifications of the specific embodiment described without departing from the inventive concepts. Consequently, the invention is to be construed as embracing each and every novel feature and novel combination of features present in and/or possessed by the invention described herein.

What is claimed is:

1. A device associated with robotic control mechanisms in a storage library subsystem for sensing and calibrating parameters relating to operation of said library subsystem, said library subsystem containing a plurality of media cartridges manipulatable by said robotic control mechanism, said device comprising:

light source means for emitting a focused beam of light producing a spot size smaller than 0.1 inch; and optical sensor means for sensing reflections of light from said light source means, wherein said optical sensor means, cooperative with said light source means, is adapted to sense presence of a media cartridge in said library subsystem, wherein said optical sensor means, cooperative with said light source means, is adapted to sense absence of a media cartridge in said library subsystem, wherein said optical sensor means, cooperative with said light source means, is adapted to calibrate positions of said robotic control mechanisms in said library subsystem, and wherein said optical sensor means, cooperative with said light source means and with said robotic control mechanisms, is adapted to read a barcode label on a media cartridge in said library subsystem while said media cartridge is moved under control of said robotic control mechanisms.

2. The device of claim 1 wherein said plurality of media cartridges are stored in slots of magazines in said library subsystem, wherein said optical sensor means, cooperative with said light source means, is adapted to sense presence of a magazine in said library subsystem, and wherein said optical sensor means, cooperative with said light source means, is adapted to sense absence of a magazine in said library subsystem.

3. In a storage library subsystem which stores a plurality of media cartridges and includes robotic control mechanisms for moving said media cartridges stored in slots within said library subsystem, wherein said robotic control mechanisms include a light source emitting a focused beam of light producing a spot size smaller than 0.1 inch and an optical reflectivity sensing device, a method for operating said library comprising the steps of:

(a) calibrating the positions of said robotic control mechanisms, wherein said robotic control mechanisms include a reflective target and said calibrating step includes the steps of:
 (a.1) illuminating said light source;
 (a.2) measuring the reflectivity of said light source with said sensing device to generate an output signal indicative of reflectivity;
 (a.3) moving said robotic mechanisms with respect to said light source and said sensing device; and
 (a.4) determining from the output signal of said sensing device the position of said robotic control mechanisms as said reflective target passes through the field of view of said sensing device;

(b) sensing the absence of a media cartridge in a slot of said library subsystem including the steps of:
 (b.1) moving said light source and said sensing device to a position opposite said slot via said robotic control mechanisms;
 (b.2) illuminating said light source;
 (b.3) measuring the reflectivity of said light source with said sensing device to generate an output signal indicative of reflectivity; and
 (b.4) determining from the output signal of said sensing device the absence of said media cartridge in said slot in said library subsystem; and (c) sensing the presence of a media cartridge in said library subsystem including the steps of:
 (c.1) moving said light source and said sensing device to a position opposite said media cartridge via said robotic control mechanisms;
 (c.2) illuminating said light source;
 (c.3) measuring the reflectivity of said light source with said sensing device to generate an output signal indicative of reflectivity; and
 (c.4) determining from the output signal of said sensing device the presence of said media cartridge in said library subsystem; and (d) reading barcode labels on said media cartridges in said library subsystem including the steps of:
 (d.1) moving said light source and said sensing device to a position opposite one of said barcode labels via said robotic control mechanisms;
 (d.2) illuminating said light source;
 (d.3) measuring the reflectivity of said light source with said sensing device to generate an output signal indicative of reflectivity;
 (d.4) moving said one of said barcode labels with respect to said light source and said sensing device via said robotic mechanisms; and
 (d.5) reading said one of said barcode labels from the output signal of said sensing device.

4. The method of claim 3 wherein said plurality of media cartridges are stored in slots of magazines in said library subsystem, said method further comprising the step of:

(e) sensing the presence of a magazine in said library subsystem including the steps of:
 (e.1) moving said light source and said sensing device to a position opposite said magazine via said robotic control mechanisms;
 (e.2) illuminating said light source;

(e.3) measuring the reflectivity of said light source with said sensing device to generate an output signal indicative of reflectivity; and (e.4) determining from the output signal of said sensing device the presence of said magazine in said library subsystem; and (f) sensing the absence of a magazine in said library subsystem including the steps of:

(e.1) moving said light source and said sensing device to a position opposite said magazine via said robotic control mechanisms;

(e.2) illuminating said light source;

(e.3) measuring the reflectivity of said light source with said sensing device to generate an output signal indicative of reflectivity; and (e.4) determining from the output signal of said sensing device the absence of said magazine in said library subsystem.

* * * * *